June 29, 1971     J. V. ANTTILA     3,588,935
APPARATUS FOR WASHING MOTOR CARS AND THE LIKE
Filed Feb. 27, 1969     6 Sheets-Sheet 1

Inventor:
Jouko V. Anttila
By [signature] AGENT

United States Patent Office 3,588,935
Patented June 29, 1971

3,588,935
APPARATUS FOR WASHING MOTOR CARS AND THE LIKE
Jouko V. Anttila, Helsinki, Finland, assignor to Auto-R. Lamminen Oy, Tampere, Finland
Filed Feb. 27, 1969, Ser. No. 802,842
Int. Cl. B60s 3/06
U.S. Cl. 15—21                 10 Claims

ABSTRACT OF THE DISCLOSURE

Apparatus for washing motor cars, comprising a frame providing an inner area for a car to be washed in the apparatus, a horizontal brush, at least one pair of vertical brushes, and optionally a pair of side brushes, preferably combined with means for administering a washing fluid to the brushes. The vertical brushes are supported so that their bearings can alternately be swivelled about two separate vertical axes, of which one axis is always in advance of the rotational axis of the respective vertical brush, with respect to the direction of movement of the apparatus along the car during the washing procedure. Two preferred embodiments are described.

---

The invention relates to an apparatus for washing motor cars, vehicles and the like, which includes a frame with a plurality of rotating brushes, moving along a stationary vehicle accommodated within the frame.

In washing apparatus of this kind it is known to mount rotating brushes on an upright frame-like chassis by which the vehicle to be washed is surrounded in such manner that a horizontally mounted brush moves over the top-surface areas and at least one pair of vertical brushes, mounted on opposite sides, moves over the side-surface areas of the vehicle, and as they so do they are preferably supplied with washing liquid.

The known washing apparatus have the disadvantage that the vertical brushes on the sides of the machine are generally unable to follow the irregularities of the side surfaces of the vehicle because of unsuitable suspension of the axes of the brushes to the framework of the washing apparatus. This occurs particularly when the apparatus moves along the vehicle, e.g. for the rough washing, at first in one direction and after that, during the fine washing or rinsing, in the opposite direction. By that time the pressure of the brushes against the side surfaces of the vehicle may increase considerably, causing damage to the sides of the vehicle or the brushes themselves.

Such defects will occur particularly when the width of the vehicle to be washed is near the maximum width capacity of the washing apparatus. A change in the direction of rotation of the brushes is not possible, or very difficult, in known washing apparatus because the pressure of the brushes against the side surfaces of the vehicle changes disadvantageously.

The object of the invention is to produce washing apparatus wherein the rotary brushes apply the same pressure against the vehicle to be washed regardless of the direction of movement of the apparaus and/or the direction of rotation of the brushes so that damages to the vehicle or the apparatus are avoided while washing results are excellent.

The washing apparatus according to the invention includes at least one vertical rotary brush on each of the opposite sides of the apparatus, the brushes being so arranged that they are urged toward the middle of the apparatus, against the side surfaces of a vehicle or car to be washed, the invention being characterized mainly in that supporting members, in which the vertical brushes are attached, are made swivelable alternately about two separate vertical axes so that one of the axes is always in advance of the rotational axis of the respective brush, with respect to the direction of movement of the apparatus during the washing procedure.

Thus the advantage is obtained that the brushes may easier follow the changes of the outer lines of the side surfaces of the vehicle, without harmful engagement with projecting parts thereof.

Other features of the invention relate to preferred embodiments of supporting the vertical brushes, either in a substantially vertical position or slightly inclined toward the top of the vehicle, the latter arrangement making for a force component caused by gravitation to assist in pressing the brushes against the side of the vehicle.

In a first exemplary embodiment, the invention features a holding member in the form of a triangle, the brush being attached to the tip of the triangle while the afore-mentioned separate vertical axes are constituted by the foot points of the triangle.

In a second embodiment, two separate pivotable frame portions are provided, one attached to a stationary side frame, one frame portion being attached to the other about a first vertical pivot while the other frame portion is in turn attached to the stationary frame, similarly about a vertical pivot, the two pivots constituting the separate vertical axes about which the vertical brush can be swivelled.

Additional, mostly optional, features relate to the provision of means for administering a washing fluid to at least one brush; means for selective rotation of at least one brush in either direction; control means, forming part of the means for moving the apparatus at least partly along the car to be washed, for selective movement in either direction, with provisions to adjust the length of movement to the length of the car.

The second embodiment may be provided with pneumatic means between the frame portions and the stationary side frame, preferably also with control means for adjusting pneumatic pressure so as to adjust the pressure exerted by the vertical brushes on the engaged portions of the car. The cylinders forming part of the pneumatic means may also include a valve, preferably a four-way valve, for swivelling the brushes to the sides of the frame so as to clear the area for the free entry and exit of cars, e.g. when the apparatus is not used.

Other objects, features and many of the attendant advantages of the invention will be readily appreciated as the same becomes better understood by reference to the following detailed description, when considered with the accompanying drawings, wherein FIG. 1 is a front elevation of a vertical side brush forming part of the inventive washing apparatus, with supporting members and bearings;

Figure 1:
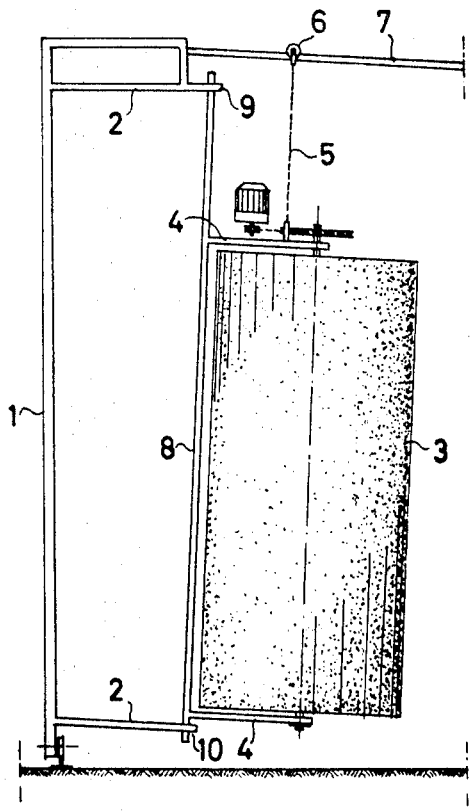
Figure 3:
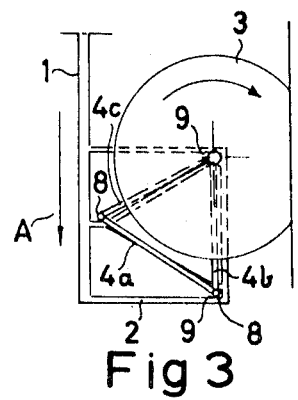
FIG. 3 is a top view of the side brush while the washing apparatus moves along the vehicle to be washed in the direction shown by arrow A.
Figure 4:
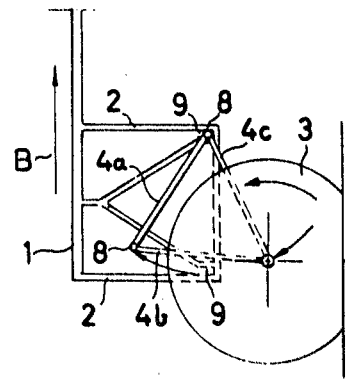
FIG. 4 is a top view similar to FIG. 3 while the apparatus moves in the opposite direction shown by arrow B.
Figure 2:
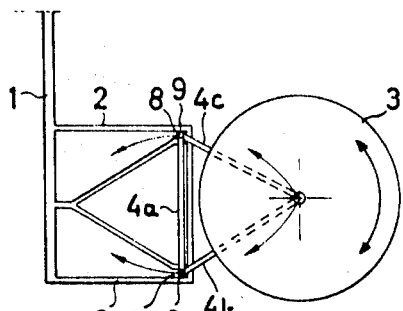
FIG. 2 is a top view of the side brush of FIG. 1 with the supporting members, in its middle position.

At first, a first, preferred embodiment of the supporting structure will be described for the vertical brushes of the washing apparatus according to the invention, with reference to FIGS. 1 to 4. It should be understood however that the rest of the apparatus, including horizontal and side brushes, and other parts of the structure comprised in the apparatus, will be shown in and described with reference to FIGS. 5 and 6 only.

The washing apparatus according to the first embodiment comprises a framework moving on rails on the floor of the room where the apparatus is mounted (see FIG. 5, to be described later in more detail). On upright side parts 1 of the framework there are attached support 2 projecting toward the middle of the apparatus (only one side being shown) and supporting holding members 4 to which a vertical rotary brush 3 is attached with suitable bearings. The members 4 are also supported by an attaching member 5 constituted, for example, by a chain or wire, fastened at the upper end to a roller 6 which is associated with a rail 7 in the upper part of the apparatus. The holding members 4 with the brush 3 are attached at a slightly inclined position in order to get a force component caused by gravitation, which attempts to press the brush 3 against the side of the vehicle to be washed (not shown in FIG. 1, on its right-hand side where the car to be washed would be located). The rail 7 is also slightly inclined toward the middle part, for the same reason.

According to the invention the members 4 are provided with vertical swiveling axes 8 so that the former constitute a triangle-shaped frame when seen from the top, wherein the axes 8 are situated at the foot points of the triangle and the axis of brush 3 is situated at the tip of the triangle. The supporting members 4 thus include two vertical axes 8, connecting transverse rods 4a as well as upper and lower supporting rods 4b and 4c which at their joining ends support the afore-mentioned bearings for the axis of brush 3. The supports 2 fastened to the side parts 1 of the framework are provided with bearing points or notches 9, 10 or similar expedients, corresponding to the distance between the axes 8. These notches are open on the sides opposite the framework side parts 1 but are not shown in detail in FIGS. 2 to 4.

This arrangement produces the technical effect that the members 4 are able to swivel about one of the axes 8, depending on the direction of movement of the washing apparatus along the vehicle to be washed. Thus one of the swivelling axes 8 is always in advance of the rotational axis of the brush 3 itself, when viewed in the moving direction of the apparatus, thus offering the technical advantage that the engaging pressure of the respective brush remains always constant, and the brushes will not get stuck on projections or irregularities on the respective sides of the vehicle being washed.

The direction of the rotation produces also the effect that the frictional force between the brush and the surface to be washed causes a moment which attempts to swivel the brush in a definite direction. The construction according to the invention allows this effect to develop. Thus the direction of rotation as well as the moving direction of the washing apparatus can be changed and the apparatus can be stopped without damaging the vehicle or the apparatus itself.

As has been mentioned before, further details of the complete washing apparatus, only partly shown in FIGS. 1 to 4, will now be described in full detail with reference to FIGS. 5 to 9.

A modified or second embodiment of the inventive features is shown in FIGS. 5 to 9, also showing common details not yet illustrated in the first embodiment of FIGS. 1 to 4. This second embodiment comprises a framework or chassis 11 made e.g. of suitable steel profiles and/or covered with metal sheet or some other suitable material. The framework is high and broad enough to have space for the vehicle to be washed. The chassis is provided with wheels 12 so that the same can be moved on rails 13 attached to the floor of the washing room. The wheels are preferably driven by a conventional electric motor which is not shown in the figures. The motor and/or its transmission or drive are preferably of the reversible type so as to allow the apparatus to be moved selectively in either direction, at least partly along the vehicle or car.

The vehicle is stationary while the apparatus moves along and over it, in forward and backward directions. The apparatus according to the invention is provided with vertically attached side brushes 14 (similar in their operation to the brush 3 shown in FIGS. 1 to 4) by means of which the sides of the vehicle are washed, and a horizontally arranged transverse upper brush 15 by means of which the top parts of the vehicle are washed. It will be understood that in either embodiment, the vehicle will be accommodated between the brushes 14, underneath the brush 15, substantially in the center of FIG. 6. The same applies to FIG. 1 where the vehicle would be to the right-hand side of brush 3, flanked on the other side by another vertical rotary brush, inclined toward the vehicle at an angle opposite to that of brush 3, as shown in FIG. 1.

Figure 5:
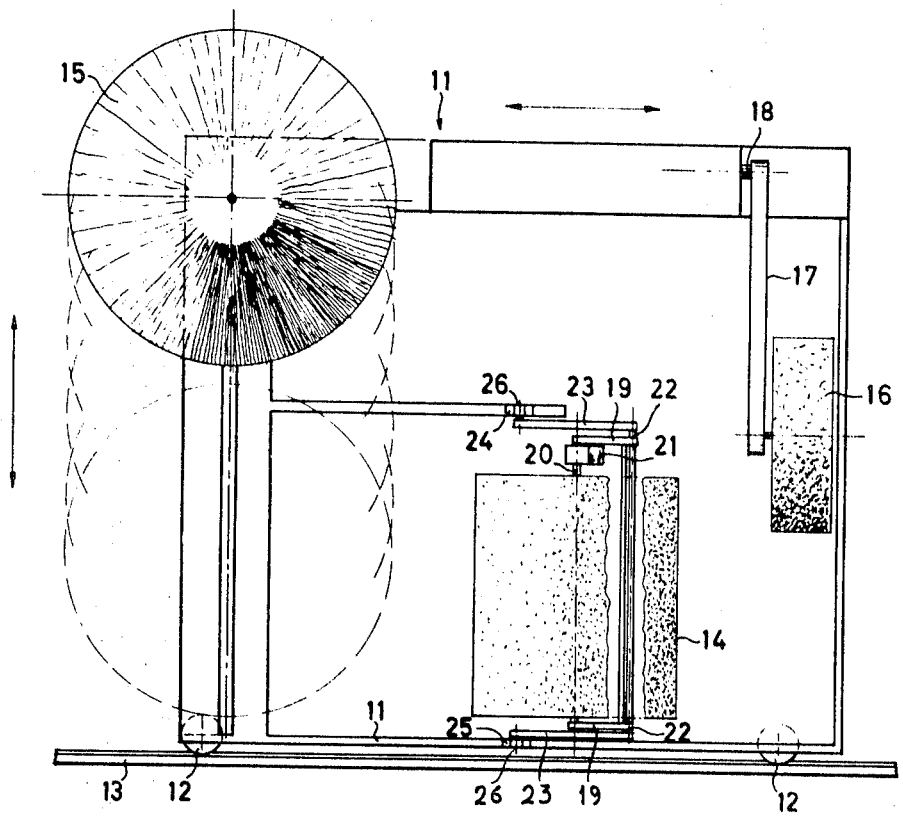
FIG. 5 is a side view of the washing apparatus according to another embodiment of the invention, the side wall of the apparatus being removed so that the brushes are visible.

Further two side brushes 16 are also shown the axes of which are horizontal and which extend lengthwise in the direction of movement of the apparatus, shown by an arrow above FIG. 5. The provision of brushes 16 is not indispensable for practising the invention in either of its preferred embodiments.

All brushes are rotated by electric motors, preferably of the reversible type so as to achieve maximum effect while the apparatus is moved forward and backward along the vehicle to be washed. The brushes are supported by appropriate means so that the brushes will follow, during the reciprocation of the apparatus, the irregular lines of the vehicle surfaces to be washed. Thus, for example, the upper brush 15 is adapted to rise and fall as the apparatus moves along and over the vehicle, and it follows the profile of its top parts. The mechanism by means of which the brush 15 is supported and moved in vertical direction (see arrow on the left-hand side of FIG. 5) is not shown here since it is not the object of the present invention.

The side brushes 16 intended mainly for washing the side windows of the vehicle are supported by pendulum-like arms 17 swinging on axes 18. The vertical side brushes 14 are also supported so that they are able to follow the irregular lines of the sides of the vehicle, as well as to accommodate various widths of vehicles. The bristles of the brushes are made of suitable, flexible, preferably plastic fibers so that the diameter of the brushes is greatest when they have their full rotating speed. In the figures, the brushes are shown in their rotating condition, with full brush diameters (and not collapsed as when stationary).

The apparatus is further provided with several conventional water or fluid sprayers so that washing is performed through the combined effect of liquid or fluid spraying and brushing. Such sprayers are not shown in the figures but will be self-explanatory to those skilled in the art.

Figure 6:
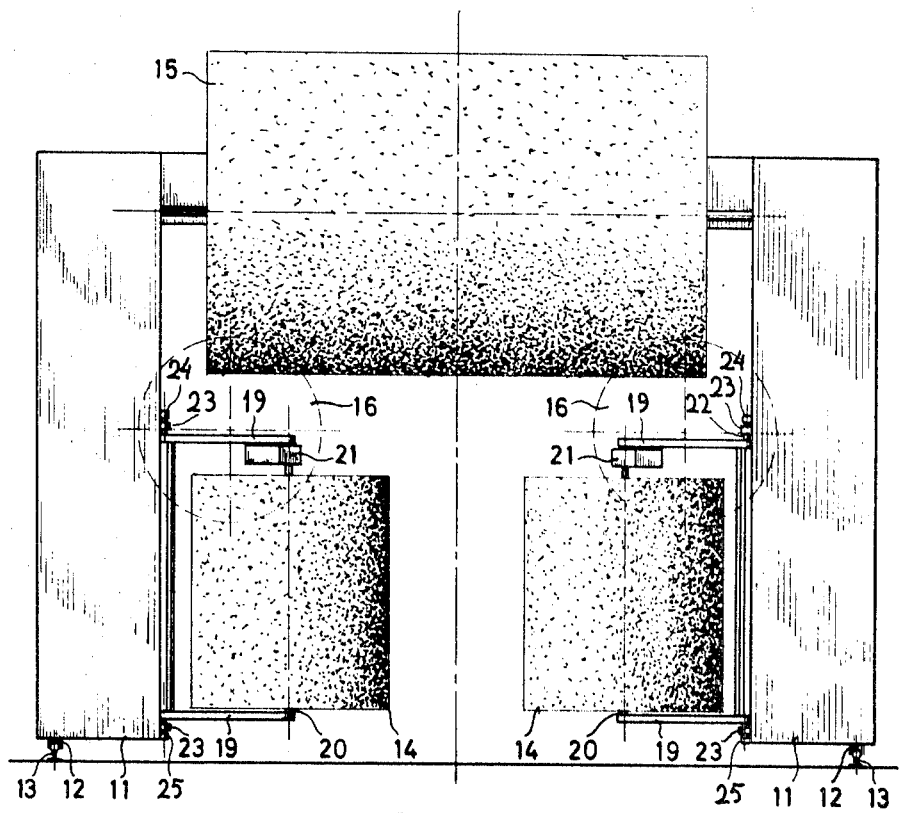
FIG. 6 is a front view of the apparatus of FIG. 5, as viewed toward the left-hand side of FIG. 5.
Figure 7:
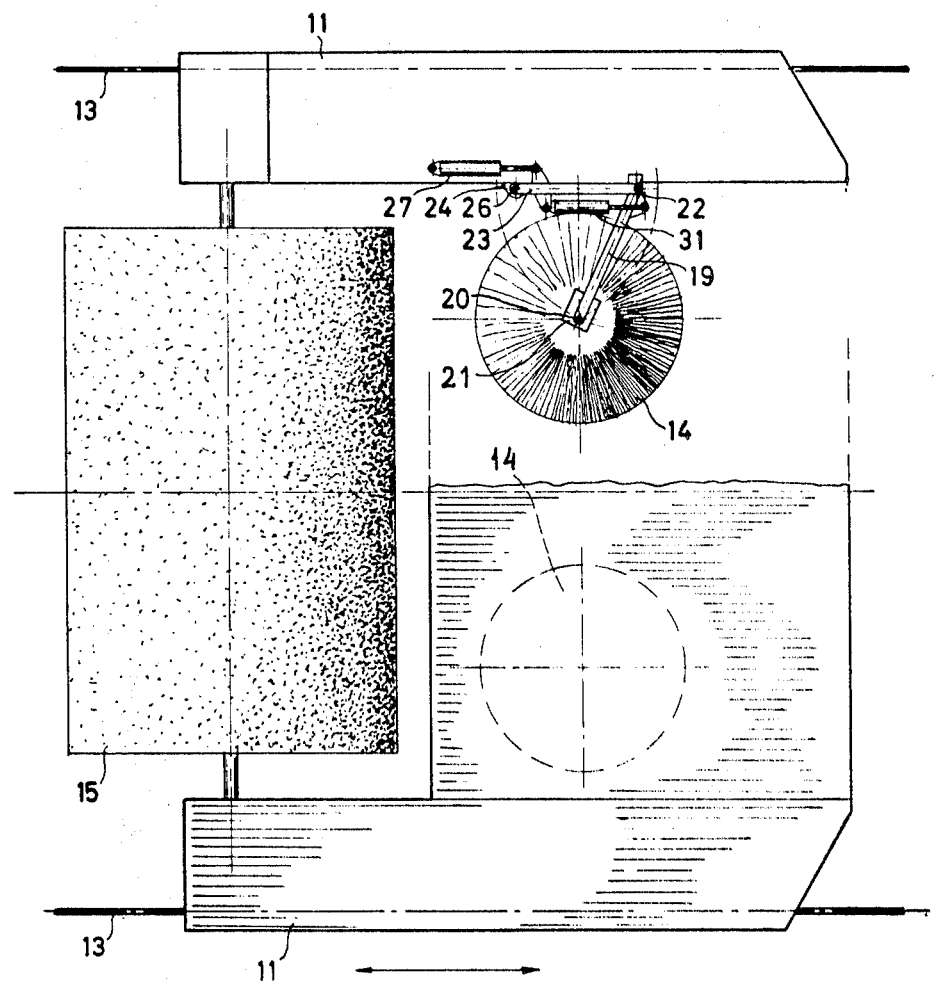
FIG. 7 is a top view of the apparatus of FIGS. 5 and 6, the top part being partially removed.

According to the invention, and shown in FIGS. 5 and 6, the vertical side brushes 14 are attached with bearings to supporting frame portions 19 by means of axes 20 which are rotated by electric motors 21 (omitted from FIG. 7 for the sake of clarity). The supporting frame again is swivelably attached by means of vertical pivot shafts 22 to another supporting frame portion 23 which in turn is attached with bearings 24 and 25 on the side frame 11, swivelling around a vertical axis 26. Further structural elements seen in these two figures will be described in connection with (and fully identified in) FIGS. 8 and 9, drawn on a somewhat larger scale than FIG. 7.

Figure 8:
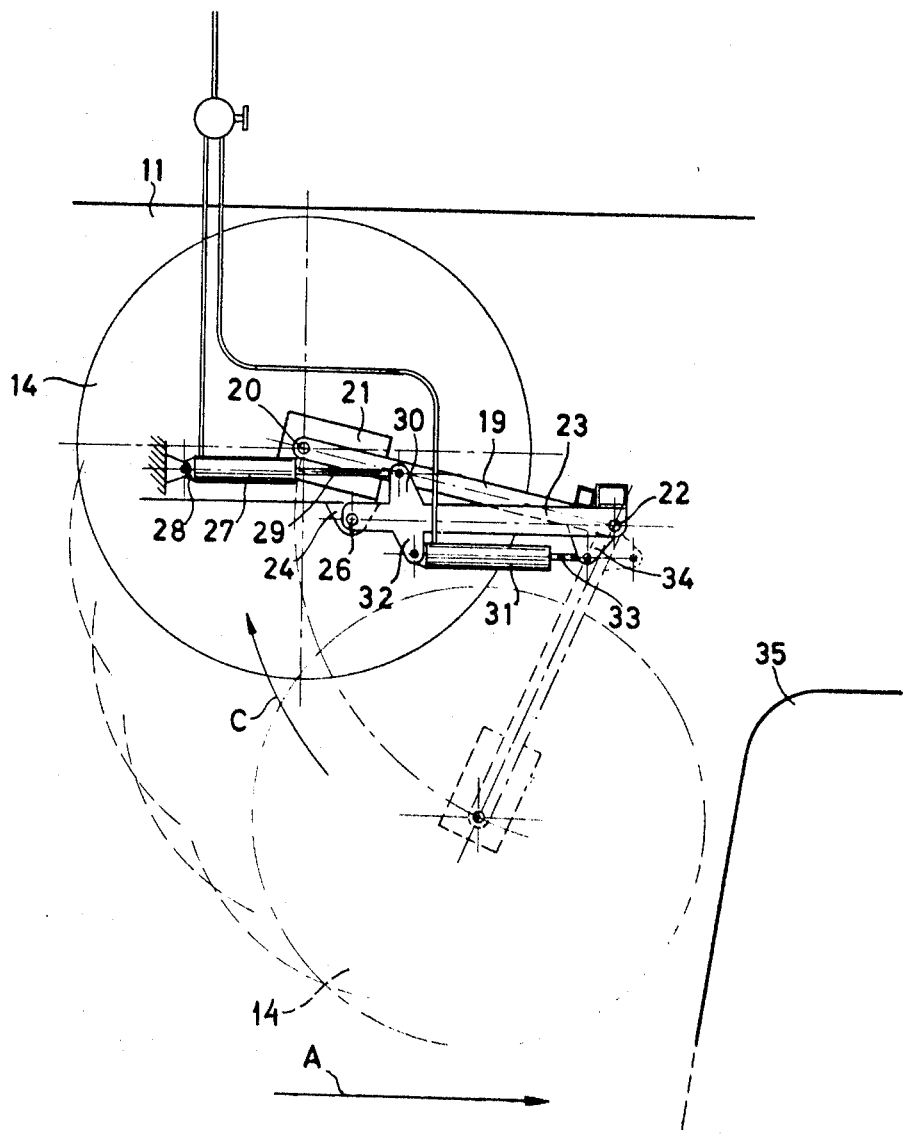
FIG. 8 is a somewhat enlarged top view of the supporting mechanism of one vertical brush seen during its movement in a direction shown by arrow C.
Figure 9:
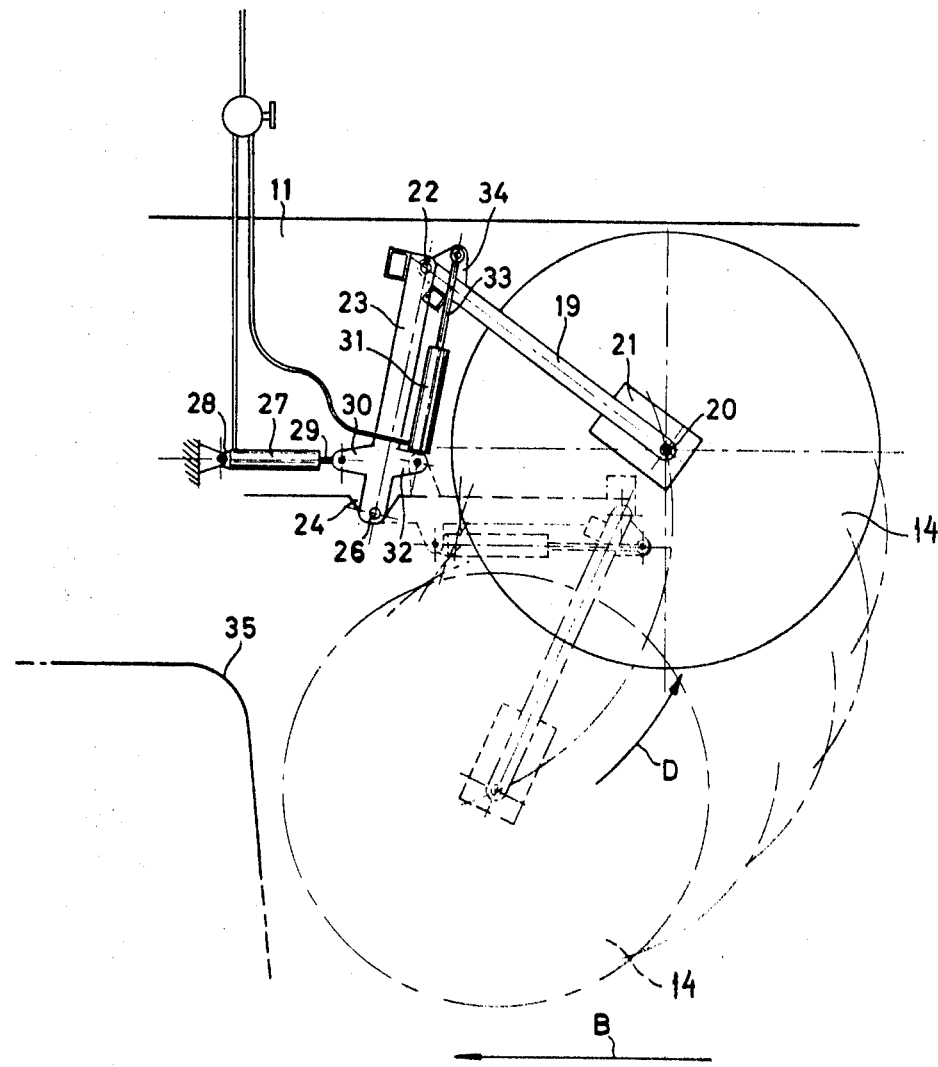
FIG. 9 is a view similar to FIG. 8 but seen in case of the opposite movement as shown by arrow D.

The supporting system of the side brushes 14 is shown in FIGS. 8 and 9. In the former, the position of the brush 14 is shown when the washing apparatus moves from left to right in the direction shown by arrow A, and in the latter, the position of brush 14 is, on the contrary, when the apparatus moves from right to left in the direction shown by arrow B. In these two figures a corner 35 of the vehicle to be washed is schematically shown for a better understanding of the inventive swivelling arrangement for the vertical brushes 14 (the same would of course apply to the alternate brushes as shown at 3 in FIG. 1).

In FIGS. 8 and 9 the side frame of the washing apparatus chassis is shown at 11. The brush 14 rotates about the vertical axis 20 driven by the motor 21. The axis 20 is attached with bearings on the supporting frame portion 19, as explained before, which in turn is attached at the other end with bearings on the other supporting frame portion 23 by means of pivot shaft 22. The frame portion 23 is further attached at its other end with bearings to the side frame 11, at the upper and lower points 24 and 25, swivelling about the vertical aixs 26. In this way the effect is obtained, according to the vention, that the brush supporting frame is always capable of swivelling about one or the other of the two vertical axes so that the brush will at no time become stuck at the corners or projections of the vehicle to be washed. It will be understood that, for functional and operational purposes, the just described vertical axes or pivots 22, 26 allow movement of the brushes 14 in a manner quite similar to that of brush 3 of the first exemplary embodiment with respect to the two vertical axes 8, 8 (see for example FIG. 2).

The brush supporting frames are preferably provided with pneumatic cylinders, as will be explained hereinafter, giving the frames a tension which will press the same, as well as the respective brushes, toward the center of the apparatus and thus against the side surfaces of the vehicle. In the beginning of the washing operation, the brushes 14 are thus in the position shown by broken lines in FIGS. 8 and 9.

A cylinder 27, which is pivoted at one end 28 with the side frame 11 and whose piston rod 29 is pivoted with an ear 30 on the frame portion 23, attempts to hold the latter in the position shown in FIG. 8. Another cylinder 31 is in turn at one end pivoted with an ear 32 on the frame portion 23 while its piston rod 33 is pivoted with an ear 34 on the previously mentioned supporting frame portion 19, whereby this cylinder 31 attempts to hold the frame portion 19 together with brush 14 in the position shown in FIG. 8 with broken lines.

While the washing apparatus is now moving in the direction of arrow A in FIG. 8, that is from left to right, and the brush 14 touches the corner 35 of the vehicle, the frame portion 19 with the brush 14 swivels about the axis 22 in the direction of arrow C at which time the cylinder 31 however always holds the brush with constant pressure against the side surface of the vehicle.

In FIG. 9, in turn, where the moving direction of the washing apparatus is opposite compared to the preceding case, as shown by arrow B, the starting position of brush 14 and its support are the same as before but now the supporting frame portion 23 swivels about the axis 26 and the brush 14 with its supporting frames swivels from its beginning position to the direction shown by arrow D while it touches the corner 35 of the vehicle.

A definite air pressure has to be effective in the cylinders 27, 31, and this pressure is adjustabe by conventional means in order to adjust brushing pressure. When the side brushes of the apparatus are supported according to the present invention, it is possible to change the moving direction of the apparatus in any position thereof, including that of the brushes even when in close frictional engagement with the vehicle.

The moving of the apparatus can be effected on the rails in forward and backward directions, conventional, adjustable electrical limit switches being preferably attached to or near the rails so as to select the moving direction of the apparatus, according to the length of the vehicle to be washed.

The apparatus according to the invention can easily be mounted so that it operates automatically when a customer drives his car under it and drops a coin in a control device provided therefor. Details of the conventional control circuit serving this purpose are not shown but will be self-explanatory.

The cylinders of the supporting frame portions can be operated by four-way valves not shown in the figures. Such operation is needed when the brushes must be swivelled toward the sides of the frames of the apparatus, when not in use.

It should be understood, of course, that the foregoing disclosure and the illustrations relate only to preferred, exemplary embodiments of the inventive car washing apparatus, and that departures from the structural details are possible within the scope of the appended claims, as exemplified by the additional features described in the preceding four paragraphs.

What I claim is:

1. An apparatus for washing motor cars and the like, comprising, in combination, a substantially upright supporting frame allowing a car to be accommodated therein for performing thereon a washing procedure, means for moving said frame at least partly along the car, a substantially horizontal brush rotatably mounted in said frame and adapted to move over top-surface areas of the car, at least one pair of substantially vertical brushes rotatably mounted on opposite sides of said frame and adapted to move over side-surface areas of the car, at least one bearing means interposed between said frame and at least one of said vertical brushes, and means for swivelling said bearing means alternately about two separate vertical axes, of which one axis is always in advance of the rotational axis of the respective one of said vertical brushes, with respect to the direction of movement of the apparatus along the car during the washing procedure.

2. The washing apparatus as defined in claim 1, further comprising means for administering a washing fluid to at least one of said brushes.

3. The washing apparatus as defined in claim 1, further comprising means for selective rotation of at least one of said brushes in either direction.

4. The washing apparatus as defined in claim 1, further comprising a pair of pivotally supported, substantially horizontal side brushes also rotatably mounted in said frame, extending parallel with the longitudinal axis of the apparatus and adapted to engage further side-surface areas of the car, and pendulum arms secured to said frame for supporting said side brushes.

5. The washing apparatus as defined in claim 1, wherein said frame includes at least one holding member having three limbs disposed in the form of a triangle, one of said at least one pair of vertical brushes being attached to the tip of the triangle by the intermediary of at least one of said bearing means, and vertical pivots at the foot points of the triangle, said pivots constituting the vertical axes about which said bearing means can be swivelled.

6. The washing apparatus as defined in claim 5, wherein said frame further includes supports extending toward said holding member and having a pair of notches open on the side facing said holding member, for alternately accommodating the respective ones of said vertical pivots.

7. The washing apparatus as defined in claim 1, wherein said frame includes two separate pivotable frame portions and a stationary side frame, one frame portion being attached to the other frame portion about a vertical pivot, one of said at least one pair of vertical brushes being attached to said one frame portion by the intermediary of at least one of said bearing means, said other frame portion being in turn attached to said side frame, similarly about a vertical pivot, different from said first-named pivot, said pivots constituting the vertical axes about which said bearing means can be swivelled.

8. The washing apparatus as defined in claim 7, further comprising pneumatic actuating cylinder means between said side frame and said other frame portion, as well as between the latter and said one frame portion.

9. The washing apparatus as defined in claim 8, further comprising control means for adjusting pneumatic pressure in at least one of said cylinder means so as thereby to adjust pressure exerted by said vertical brushes on engaged portions of the car.

10. The washing apparatus as defined in claim 8, whereing said cylinder means includes valve means for swivelling said vertical brushes to the sides of said frame so as to clear the same for the entry and exit of cars.

References Cited

UNITED STATES PATENTS 3,233,264  2/1966  Nickl et al. _____ 15—21(CO)
3,238,551  3/1966  Cirino et al. _____ 15—21(CO)

EDWARD L. ROBERTS, Primary Examiner